United States Patent Office 3,528,829
Patented Sept. 15, 1970

3,528,829
LOW EXPANSION GLASS COMPOSITIONS
Nils Tryggve E. A. Baak, Ridgefield, Conn., and Charles F. Rapp, Toledo, Ohio, assignors to Owens-Illinois, Inc., a corporation of Ohio
No Drawing. Continuation-in-part of applications Ser. No. 465,381, June 21, 1965, and Ser. No. 552,992, May 25, 1966. This application Sept. 28, 1966, Ser. No. 582,540
Int. Cl. C03c 3/04, 3/30
U.S. Cl. 106—52                    32 Claims

ABSTRACT OF THE DISCLOSURE

Low thermal expansion glasses of the $Cu_2O$-$Al_2O_3$-$SiO_2$ system are disclosed, wherein the sum of the $SiO_2$ plus $Al_2O_3$ is preferably at least about 70 mole percent and the sum of the $Cu_2O$ plus $Al_2O_3$ is at least about 5 mole percent. The glasses will further include minor proportions of other oxides such as, for example, an oxide of Ta, W, Hf, V, Mo, Nb, La, Ce, Pr, Nd, Ge, Th, Be, Ca, Zr, Pb, or mixtures thereof; the glasses may further include $TiO_2$, $B_2O_3$, $Fe_2O_3$, CoO, NiO or mixtures thereof. These glasses may be used in the sealing art or to form astronimocal mirrors.

---

This application is a continuation-in-part of applicants' applications, U.S. Ser. No. 465,381, filed June 21, 1965, now abandoned, and copending U.S. Ser. No. 552,992, filed May 25, 1966.

The present invention relates to novel glass compositions; and, more particularly, the invention pertains to glass compositions containing copper oxide and other oxides which glasses have a low thermal expansion coefficient and relatively low melting characteristics. Specifically, the invention relates to novel glasses based on a system of cuprous oxide-cupric oxide-alumina-silica which system can also contain other oxides and additives. The invention further relates to products made from the subject glasses and to a method for making the same.

Glasses possessing low expansion characteristics are extremely advantageous and desirable for the reason that their thermal shock resistance is good and any dimensional changes in articles produced from these glasses are kept at a minimum. Because of the unusually good properties of the glasses of the instant invention, the novel glass compositions can be utilized in any number of applications. For example, the copper containing glasses of the present invention, because of their relative ease of melting and low thermal expansion, are, therefore, particularly suitable for sealing fused quartz and for sealing other surfaces such as ceramics, metals and the like. Among the other applications in the fields of science and commerce for the subject glasses is their use in the optical art. Optical devices require extremely precise dimensions, and for that reason, glasses which undergo significant changes in shape and dimensions cannot be tolerated for these purposes. Glasses of the present invention, however, because their coefficients of thermal expansions are relatively low, are therefore, exceptionally well suited for the production of such devices as astronomical mirrors. It has been determined that the glasses of the present invention show excellent performance for such mirrors and that the optical image is relatively undistorted by sharp variations in temperature.

Accordingly, it is an object of the present invention to provide novel glass compositions that have desirable properties and characteristics.

It is a further object of the present invention to provide glass compositions wherein copper is present as a major and important constituent of the glass.

It is a further object of the present invention to provide copper glass compositions wherein at least a substantial amount of the copper is present in the cuprous state.

It is still a further object of the present invention to provide novel glass compositions that contain copper and other glass-forming oxides.

Yet a further object of the present invention is to provide unique glass compositions that contain copper and oxides of the transition and rare earth groups.

It is a further object of the present invention to provide copper glass compositions that have low coefficient of thermal expansion.

It is a further object of the present invention to provide copper glass compositions that have relatively low melting characteristics.

It is a further object of the present invention to provide colored glasses containing copper oxides that have good resistance to thermal shock and relatively low melting temperatures.

It is a further object of the present invention to provide copper glasses having desirable properties which make them suitable for a wide variety of uses.

It is a further object of the present invention to provide copper glasses having low coefficients of thermal expansion and good resistance to thermal shock which makes them suitable for the preparation of optical devices.

It is a further object of the present invention to provide copper glasses of relatively high fluidity that are useful as solder glasses.

It is a further object of the present invention to provide novel copper glass compositions that have good chemical durability and which are useful as solder glasses.

It is a further object of the present invention to provide shaped optical devices that have desirable properties and characteristics.

In attaining the above objects, one feature of the present invention resides in copper glass compositions of the cuprous oxide-cupric oxide-alumina-silica ($Cu_2O$-CuO-$Al_2O_3$-$SiO_2$) system. It is believed that a substantial amount of copper in the glass is in the cuprous state. Preferably a predominant amount, i.e., at least 50 mole percent of the copper is in the cuprous state. Therefore, the system is referred to hereinafter as $SiO_2$-$Al_2O_3$-$Cu_2O$ in which $Cu_2O$ means either cuprous oxide, cupric oxide, or both together in an amount that will give the equivalent CuO or $Cu_2O$, as starting materials in the batch, copper oxide in both forms may be used for purposes of the present invention because the final state of the copper is independent of the original oxidation state of the oxide. If it is desired to reach a particular oxidation state of copper, this can be achieved by providing oxidizing conditions proper for the desired state. The novel copper glass compositions of the above base system consist essentially of silica, 0.5 to 30 mole percent alumina, and 1.5 to 35 mole percent copper oxide. In a preferred aspect of the present invention, the silica is present in an amount ranging from 50 to 94 mole percent. In our copending cases, the thermal coefficient of expansion of these glasses is relatively low, generally being about $10 \times 10^{-7}$ and less. In the present case, with the addition of oxides of the transition and rare earth series to the base system, the thermal coefficient of expansion of these latter glasses is also relatively low, but in some glasses, the expansion may be slightly higher.

According to a further feature of the present invention, glass compositions of low expansion are provided based on the silica, alumina, and copper oxide ($SiO_2$, $Al_2O_3$, and $Cu_2O$) system having added thereto titanium dioxide ($TiO_2$) or boric oxide ($B_2O_3$) or both titanium dioxide and boric oxide. Copper glasses coming within this aspect of the present invention have the following composition, all ranges being inclusive of the terminal values: silica ($SiO_2$) 50 to 94 mole percent; alumina ($Al_2O_3$) 0.5 to 30 mole percent; copper oxide ($Cu_2O$) 1.5 to 35 mole percent; titanium dioxide ($TiO_2$) 0 to 11 mole percent; boric oxide ($B_3O_2$) 0 to 12.5 mole percent; nickel oxide (NiO) 0 to 6 mole percent; and, iron oxide ($Fe_2O_3$) 0 to 6 mole percent.

Another feature of the present invention resides in copper glass compositions of the silica-alumina-cuprous oxide system to which have been added a fluorine-containing component, such as $AlF_3$, which contributes fluorine to the resulting glass composition.

Still a further feature of the present invention as disclosed in our copending cases supra resides in copper glasses formed from the $SiO_2$-$Al_2O_3$-$Cu_2O$ system having added thereto selected quantities of boron, nickel, chromium, iron, cobalt, tantalum, tungsten, manganese, zinc and other transition metals, rare earth oxides and mixtures thereof. Exemplary of rare earth oxides that can be added to the base glass forming system are lanthanum, cerium, praseodymium, neodymium, and the like. Exemplary of transition oxides that can be incorporated in the base glass are, as defined herein, the members of the B groups of the Periodic Table as well as Group VIII, such as, titanium, hafnium, vanadium, molybdenum cadmium, niobium, and the like. Other oxides that can be added are germanium, thorium, beryllium, and the like.

Other objects, features and advantages of the present invention will become apparent from the following detailed description and claims.

The copper glasses of the present invention have extremely desirable characteristics of low linear thermal expansion and a relatively low melting point. Although the thermal expansion characteristics of the glasses of the present invention is influenced by the presence of the oxides of copper, the variation in the copper content unexpectedly does not produce markedly great variations in the thermal expansion of the glasses.

Heretofore, it has been generally accepted that low melting characteristics and low thermal expansion of glasses were properties that were incompatible with each other. The present invention has demonstrated that this generally accepted principal is not applicable to the compositions that are described herein. General experience has been that the lower the thermal expansion, the higher the melting temperature becomes. This property has not been generally observed in the copper glasses of the present invention. On the contrary, one of the important aspects of the copper glasses of the $SiO_2$-$Al_2O_3$-$Cu_2O$ system is their surprising viscosity-thermal expansion behavior. That is, the copper glasses of the present invention display the extremely desirable characteristics of both low expansion and relatively low melting temperatures.

Owing to the fact that copper is used as a major constituent in the glasses of the present invention, as expected the glasses are strongly colored, generally green, reddish, brown or black depending on the copper concentration and the thickness of the glass. An important factor concerning the oxidation state of the copper is the temperature. At high temperature, the monovalent cuprous state is favored while low temperatures favor the divalent cupric state. For that reason, for general applications, a controlled atmosphere can be used to protect the glass or glass surface. An oxidizing, neutral atmosphere or slightly reducing atmosphere may be used for the desired purpose. Other conditions which are necessary to produce particular articles are described hereinafter.

According to the present invention, there is provided copper glasses of the $SiO_2$-$Al_2O_3$-$Cu_2O$ system having low expansion and relatively low melting temperatures comprising the following components, all values being in mole percent, based on the total composition:

| | |
|---|---|
| $SiO_2$ | 50–94 |
| $Al_2O_3$ | 0.5–30 |
| $Cu_2O$ | 1.5–35 |

In preparing glasses of the present invention, the batch ingredients are mixed, melted and heated to such temperatures so that all substances are present in the liquid state, thereby enabling the formation of a glass from a homogeneous melt. Generally, the subject glasses are those wherein the sum of $SiO_2$+$Cu_2O$ is at least 70 mole percent, preferably 80 mole percent, and the sum of $Cu_2O$+$Al_2O_3$ is at least 10 mole percent. In the preferred aspect of the invention, the ratio of $Cu_2O$:$Al_2O_3$ ranges from about 0.9:1 to 2:1.

Extremely desirable novel copper glasses are disclosed in our copending cases based on the $SiO_2$-$Al_2O_3$-$Cu_2O$ system which has as additional components $TiO_2$ or $B_2O_3$ or both shown in the following ranges: 50 to 94 mole percent $SiO_2$, 0.5 to 30 mole percent $Al_2O_3$, 1.5 to 35 mole percent $Cu_2O$, 0 to 11 mole percent $TiO_2$, and 0 to 12.5 mole percent $B_2O_3$.

Extremely desirable copper glasses of the present case are based on the $SiO_2$-$Al_2O_3$CuO or $Cu_2O$ system which has as additional components $TiO_2$, $B_2O_3$, $ZrO_2$, $V_2O_5$, $CeO_2$, $ThO_2$, $MoO_3$, $WO_3$, $La_2O_3$, $Nb_2O_5$ $Ta_2O_5$, $GeO_2$, and mixtures thereof. The following compositional ranges are representative of the subject glasses: 50 to 94 mole percent $SiO_2$, 0.5 to 30 mole percent $Al_2O_3$, 1.5 to 35 mole percent $Cu_2O$, 0 to 11 mole percent $TiO_2$, 0 to 12.5 mole percent $B_2O_3$, and from 0 to 8 mole percent of a member selected from the group consisting of PbO, BeO, $HfO_2$, $ZrO_2$, $V_2O_5$, $CeO_2$ $ThO_2$, $MoO_3$, $La_2O_3$, $Nb_2O_5$, $Ta_2O_5$, $GeO_2$, $WO_3$, and mixtures thereof. A glass composition wherein said glass consists essentially of 50 to 94 mole percent $SiO_2$, 0.5 to 30 mole percent $Al_2O_3$, 1.5 to 35 mole percent $Cu_2O$, 0 to 11 mole percent $TiO_2$, 0 to 12.5 mole percent $B_2O_3$, 0 to 6 mole percent $Fe_2O_3$, 0 to 6 mole percent CoO, 0 to 6 mole percent NiO and wherein the sum of $TiO_2$, $B_2O_3$, $Fe_2O_3$, CoO and NiO is from 1 to 15 mole percent and wherein said glass also contains a member selected from the group of glass forming oxides consisting of $V_2O_5$, $CeO_2$, $ThO_2$, $MoO_3$, $Nb_2O_5$, $Ta_2O_5$, $GeO_2$, $WO_3$, $La_2O_3$, $ZrO_2$, $HfO_2$, BeO, PbO and mixtures thereof. Generally, the compositions of the present invention will contain, in mole percent, 70 to 85 $SiO_2$, 2 to 15 $Al_2O_3$, 2 to 15 $Cu_2O$, 1 to 8 $B_2O_3$, 1 to 8 $TiO_2$ and 1 to 8 $V_2O_5$, $CeO_2$, $ThO_2$, $MoO_3$, $Nb_2O_5$, $Ta_2O_5$, $GeO_2$, $WO_3$, $La_2O_3$, $ZrO_2$, $HfO_2$, BeO and PbO. The compositions also include 72 to 85 $SiO_2$, 2.5 to 12.5 $Al_2O_3$, 2 to 12.5 $Cu_2O$, 1 to 6 $B_2O_3$, 1 to 6 $TiO_2$ and 1 to 6 of the glass forming oxide group, wherein all concentrations are in mole percent.

Particularly suitable compositions coming within the disclosed compositional ranges are those wherein the sum of $SiO_2$+$Cu_2O$ is at least 80 mole percent and wherein the sum of $Cu_2O$+$Al_2O_3$ is at least 5 mole percent. Exemplary of now preferred compositions are the following: a glass consisting of 72 to 85 mole percent $SiO_2$, 2.5 to 15 mole percent $Al_2O_3$, 1.5 to 15 mole percent $Cu_2O$, 2 to 8 mole percent $B_2O_3$, and 1 to 8 mole percent $ZrO_2$; a glass consisting of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$; and 1 to 8 mole percent $CeO_2$; a glass consisting essentially of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $ThO_2$; a glass consisting essentially of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $MoO_3$; a glass consisting of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $WO_3$; a glass consisting essentially of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $La_2O_3$; a glass composition consisting essentially of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $Nb_2O_5$; a glass composition consisting of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $Ta_2O_5$; a glass composition consisting essentially of 72 to 85 mole percent $SiO_2$, 2.5 to 15 mole percent $Al_2O_3$, 1 to 15 mole percent $Cu_2O$, 2 to 8 mole percent $B_2O_3$, and 1 to 8 mole percent $Ta_2O_5$; and a glass composition consisting essentially of 72 to 85 mole percent $SiO_2$, 2.5 to 15 mole percent $Al_2O_3$, 1 to 15 mole percent $Cu_2O$, and 1 to 8 mole percent $Ta_2O_5$; and a glass composition consisting of 72 to 85 mole percent $SiO_2$, 2.5 to 15 mole percent $Al_2O_3$, 1 to 15 mole percent $Cu_2O$, 2 to 8 mole percent $B_2O_3$, 1 to 8 mole percent $TiO_2$, and 1 to 8 mole percent $GeO_2$.

Another novel aspect of the instant invention pertains to unique glass compositions of the silica-alumina-cuprous oxide base systems wherein oxides of vanadium, niobium, tantalum, hafnium, beryllium, lead and the like are added in invention concentrations to the base glass system. The compositional range for the base system of these glasses is from 50 to 94 mole percent $SiO_2$, 0.5 to 30 mole percent $Cu_2O$, 0.5 to 30 mole percent $Al_2O_3$ and from 0 to 6.5 mole percent of a member selected from the group consisting of $V_2O_5$, $Nb_2O_5$, $Ta_2O_5$, $HfO_2$, and PbO and mixtures thereof. The glass system can also contain from 0 to 12 mole percent BeO, and this latter oxide can be mixed with the oxides mentioned immediately above to formulate the desired subject glasses. Generally, the instant glass will consist of 50 to 94 mole percent $SiO_2$, 0.5 to 30 mole percent $Al_2O_3$, 1.5 to 35 mole percent $Cu_2O$ and a glass forming oxide selected from the group of oxides consisting of $ZrO_2$, $V_2O_5$, $Nb_2O_5$, $Ta_2O_5$, $HfO_2$, BeO, PbO, $CeO_2$, $ThO_2$, $MoO_3$, $GeO_2$, $WO_3$, $La_2O_3$ and mixture thereof. Often, the composition will contain, expressed in mole percent, 70 to 85 $SiO_2$, 2 to 15 $Al_2O_3$, 2 to 15 $Cu_2O$ and 1 to 8 of $ZrO_2$, $V_2O_5$, $Nb_2O_5$, $Ta_2O_5$, $HfO_2$, BeO, PbO, $CeO_2$, $ThO_2$, $MoO_3$, $GeO_2$, $WO_3$ and $La_2O_3$.

Exemplary of presently preferred glass compositions are a glass consisting essentially of 72 to 85 mole percent $SiO_2$, 2.5 to 12.5 mole percent $Al_2O_3$, 2.5 to 12.5 mole percent $Cu_2O$, and from 1 to 6.5 mole percent $ZrO_2$; a glass consisting of 72 to 85 mole percent $SiO_2$ 2 to 15 mole percent $Al_2O_3$, 2 to 15 mole percent $Cu_2O$, and 1 to 6.5 mole percent $V_2O_5$; a glass composition consisting of 72 to 85 mole percent $SiO_2$, 2 to 15 mole percent $Al_2O_3$, 2 to 15 mole percent $Cu_2O$, and 1 to 6.5 mole percent $Nb_2O_5$; a glass composition consisting of 72 to 85 mole percent $SiO_2$, 2 to 15 mole percent $Al_2O_3$, 2 to 15 mole percent $Cu_2O$, and 1 to 6.5 mole percent $Ta_2O_5$; a glass composition consisting of 72 to 85 moles percent $SiO_2$, 2 to 15 mole percent $Al_2O_3$, 2 to 15 mole percent $Cu_2O$, and 1 to 6.5 mole percent $HfO_2$; a glass consisting of 72 to 85 mole percent $SiO_2$, 2 to 15 mole percent $Cu_2O$, 2 to 15 mole percent $Al_2O_3$, and 2 to 12.5 mole percent BeO; and a glass consisting of 72 to 85 mole percent $SiO_2$, 2.5 to 15 mole percent $Al_2O_3$, 2 to 15 mole percent $Cu_2O$, and 2.5 to 6.5 mole percent PbO.

Another aspect of the present invention relates to copper glass compositions of the silica-alumina-cupric oxide system wherein a fluorine-containing component is added. For example, $AlF_3$ can be added to the present glass in a concentration range of up to about 6.5 mole percent with the present preferred range being 0 to 5 mole percent. It is to be understood that while $AlF_3$ is cited as exemplary of a fluoride ingredient, other functionally equivalent components, e.g., fluorides, may be used in place thereof to contribute the fluorine to the final glass composition.

The various ingredients added to the base glass system of the instant invention can be in the form of oxides, carbonates, fluorides, silicates, or any other form which does not disturb or adversely affect the desired composition.

The batch materials employed for preparing the subject glasses were of high purity commercially-available materials and were selected from the following: $SiO_2$ Kona Quintas Quartz, $Al_2O_3$ Alcoa A-14 alumina, and Baker analytical reagents and Fischer certified reagents: $Cu_2O$, CuO, $PbCO_3$, $CdCO_3$, $B_2O_3$, $ThO_2$, $CeO_2$, $La_2O_3$, $Ta_2O_5$, $MoO_3$, $WO_3$, $GeO_2$, BeO, $V_2O_5$, $Nb_2O_5$, $AlF_3$, CdO, $HfO_2$, NiO, CoO, $Fe_2O_3$, and the like.

In the preparation of the novel glasses of the subject invention as disclosed and claimed herein, the batch ingredients were mixed by hand or in a commercially available V-blender to obtain a homogeneous mixture. Any suitable mixing means and heating means can be employed to obtain the desired melt. The glasses prepared herein were melted in a 90% platinum-10% rhodium crucible. In the examples reported hereinafter, the sizes of the melts varied and generally included samples of 100 grams. The melting was carried out in electric furnaces wherein the melting temperature was in most instances about 1500° C. and in a few instances, 1600° C. was employed with glasses which exhibited difficulty in melting. It was observed that 16 hours were generally sufficient for the duration of the melting to obtain a satisfactory glass. For the thermal expansion test, rods were drawn from the melts. To produce the rods, a silica or mullite rod was dipped into the molten glass for the start of rod pulling. In conducting the thermal expansion tests for accumulation of the data reported in the examples, conventional dilatometric method was used (0–300° C.) on samples four inches long. A limited number of determinations of annealed as well as unannealed samples covering a wider temperature span (−200° C. to +300° C.) were run on the Carson-Dice dilatometer. It has been observed that annealed glasses exhibited about 1 unit ($1 \times 10^{-7}$) less thermal expansion (0–300° C.) than unannealed glasses.

Examples of batches employed to produce the subject glasses according to the mode and manner of the present invention are set forth in Tables 1A and 2A immediately below.

TABLE 1A.—BATCH INGREDIENTS, IN GRAMS

| Example No. | $SiO_2$ | $Al_2O_3$ | $Cu_2O$ | $PbCO_3$ | $TiO_2$ | CuO | $CdCO_3$ | $B_2O_3$ | $ZrO_2$ | $ThO_2$ | $CeO_2$ | $La_2O_3$ | $Ta_2O_5$ |
|---|---|---|---|---|---|---|---|---|---|---|---|---|---|
| 1 | 55.41 | 15.67 | 11.00 | 20.07 | | | | | | | | | |
| 2 | 67.49 | 13.48 | | | 5.28 | 5.26 | 11.40 | | | | | | |
| 3 | 60.12 | 17.00 | 14.31 | | | | | 8.56 | | | | | |
| 4 | 72.02 | 9.93 | | | 5.96 | | | 4.70 | 7.39 | | | | |
| 5 | 58.24 | 16.70 | 23.44 | | | | | | | 1.61 | | | |
| 6 | 68.14 | 9.40 | | | 3.40 | 3.38 | | 4.44 | | | 11.24 | | |
| 7 | 72.89 | 10.05 | | | 7.27 | 2.41 | | 4.75 | | | | 2.61 | |
| 8 | 67.66 | 9.70 | | | 7.01 | 3.49 | | 4.58 | | | | 7.55 | |
| 9 | 71.47 | 8.34 | | | 7.13 | 3.55 | | 4.66 | | | | | 4.85 |
| 10 | 70.26 | 8.20 | | | 7.01 | 3.49 | | 4.58 | | | | | 6.46 |
| 11 | 66.52 | 9.18 | | | 4.42 | 3.30 | | 4.34 | | | | | 12.23 |
| 12 | 53.52 | 12.11 | 21.25 | | | | | | | | | | 13.12 |

TABLE 2A.—BATCH INGREDIENTS, IN GRAMS

| | $SiO_2$ | $Al_2O_3$ | $Cu_2O$ | $TiO_2$ | CuO | $B_2O_3$ | $H_2MoO_4$ | $WO_3$ | $GeO_2$ | Beryl ore | $V_2O_5$ | $Nb_2O_5$ | $HfO_2$ | $CoCO_3$ | $Al(NO_3)_3$ |
|---|---|---|---|---|---|---|---|---|---|---|---|---|---|---|---|
| 13 | 73.46 | 8.57 | | 7.33 | 3.65 | 4.79 | 2.91 | | | | | | | | |
| 14 | 75.27 | 7.01 | | 4.88 | 3.65 | 4.79 | 5.83 | | | | | | | | |
| 15 | 72.48 | 8.46 | | 7.23 | 3.60 | 4.73 | | 3.50 | | | | | | | |
| 16 | 75.66 | 3.13 | | 7.37 | 3.67 | 2.14 | | | 8.03 | | | | | | |
| 17 | 46.32 | | 16.71 | | | | | | | 46.02 | | | | | |
| 18 | 71.18 | 9.81 | | 7.10 | 3.53 | 2.32 | | | | | 6.06 | | | | |
| 19 | 51.81 | 16.57 | 23.35 | | | | | | | | | 2.36 | | | |
| 20 | 51.99 | 13.13 | 23.03 | | | | | | | | | 5.85 | | | |
| 21 | 72.11 | 8.42 | | 7.20 | 3.58 | | | | | | | | 3.99 | | |
| 22 | 57.19 | 16.39 | 23.00 | | | | | | | | | | 3.42 | | |
| 23 | 57.60 | 16.57 | 23.17 | | | | | | | | | | | 2.73 | |
| 24 | 64.07 | 11.52 | | 5.01 | 9.98 | | | | | | | | | | 9.42 |
| 25 | 73.94 | 5.54 | | 5.43 | 5.40 | | | | | | | | | | 10.19 |
| 26 | 60.65 | 17.62 | 19.78 | | | | | | | | | | | 3.46 | |

¹ The actual formula is $Al(NO_3)_3 \cdot 9H_2O$.

The following Tables 1B and 2B contains examples of the novel glasses and the coefficient of expansion of glass compositions prepared according to the mode and manner of the present invention.

TABLE 1B.—THERMAL EXPANSION AND COMPOSITION
[Mole Percent]

| Example No. | $\alpha \times 10^{-7}$ (0–300° C.) | $SiO_2$ | $Al_2O_3$ | CuO | $B_2O_3$ | $ZrO_2$ | $Cu_2O$ | $TiO_2$ | $V_2O_5$ | $CeO_2$ | $ThO_2$ | $MoO_3$ | BeO | PbO |
|---|---|---|---|---|---|---|---|---|---|---|---|---|---|---|
| 27 | 11.9 | 80.0 | 6.5 | 5.0 | 4.5 | 4.0 | | | | | | | | |
| 28 | 6.4 | 74.0 | 12.5 | | | 1.0 | 12.5 | | | | | | | |
| 29 | 12.6 | 80.0 | 6.5 | 3.0 | 2.25 | | | 6.0 | 2.25 | | | | | |
| 30 | 6.6 | 74.0 | 12.6 | | | | 12.5 | | 1.0 | | | | | |
| 31 | 11.4 | 80.0 | 6.5 | 2.0 | 4.5 | | | 6.0 | | 1.0 | | | | |
| 32 | 14.0 | 80.0 | 6.5 | 3.0 | 4.5 | | | 3.0 | | | 3.0 | | | |
| 33 | 9.6 | 80.0 | 5.5 | 3.0 | 4.5 | | | 6.0 | | | | | 1.0 | |
| 34 | 9.4 | 82.0 | 4.5 | 3.0 | 4.5 | | | 4.0 | | | | | 2.0 | |
| 35 | 9.7 | 80.0 | 6.5 | 3.0 | 4.5 | | | 5.0 | | | | | 1.0 | |
| 36 | 15.6 | 78.3 | 4.6 | | | | | 4.6 | | | | 12.5 | | |
| 37 | 14.5 | 75.0 | 12.15 | | | | | 6.25 | | | | | | 6.25 |

TABLE 2B.—THERMAL EXPANSION AND COMPOSITION
[Mole Percent]

| Example No. | $\alpha \times 10^{-7}$ (0–300° C.) | $SiO_2$ | $Al_2O_3$ | CuO | $B_2O_3$ | $TiO_2$ | $WO_3$ | $La_2O_3$ | $Nb_2O_5$ | $Cu_2O$ | $Ta_2O_5$ | $GeO_2$ | $HfO_2$ | CaO |
|---|---|---|---|---|---|---|---|---|---|---|---|---|---|---|
| 38 | 10.2 | 80.0 | 5.5 | 3.0 | 4.5 | 6.0 | 1.0 | | | | | | | |
| 39 | 13.3 | 80.0 | 5.5 | 3.0 | 4.5 | 6.0 | | 1.0 | | | | | | |
| 40 | 10.6 | 80.0 | 5.5 | 3.0 | 4.5 | 6.0 | | | 1.0 | | | | | |
| 41 | 6.9 | 74.0 | 12.5 | | | | | | 1.0 | 12.5 | | | | |
| 42 | 9.7 | 80.0 | 5.5 | 3.0 | 4.5 | 6.0 | | | | | 1.0 | | | |
| 43 | 9.6 | 80.0 | 6.5 | 3.0 | 4.5 | 5.0 | | | | | 1.0 | | | |
| 44 | 11.2 | 80.0 | 6.5 | 3.0 | 4.5 | | | | | | 2.0 | | | |
| 45 | 7.1 | 74.0 | 12.5 | | | | | | | 12.5 | | 1.0 | | |
| 46 | 6.7 | 75.0 | 10.0 | | | | | | | 12.5 | | 2.5 | | |
| 47 | 6.6 | 82.0 | 2.0 | 3.0 | 2.0 | 6.0 | | | | | | 5.0 | | |
| 48 | 7.6 | 80.0 | 3.0 | 3.0 | 3.0 | 6.0 | | | | | | 5.0 | | |
| 49 | 7.4 | 74.0 | 12.5 | | | | | | | 12.5 | | | 1.0 | |
| 50 | 11.4 | 75.0 | 12.5 | | | | | | | 10.0 | | | | 2.5 |

While illustrative embodiments of this invention have been described with particularity, it will be understood that, in accordance with the patent statutes and law, modifications and variations of the present invention may be made without departing from the scope and spirit thereof.

We claim:

1. A glass composition having a coefficient of thermal expansion of about $10 \times 10^{-7}$ wherein said glass consists essentially of 50 to 94 mole percent $SiO_2$, 0.5 to 30 mole percent $Al_2O_3$, 1.5 to 35 mole percent $Cu_2O$, 0 to 11 mole percent $TiO_2$, 0 to 12.5 mole percent $B_2O_3$, 0 to 6 mole percent $Fe_2O_3$, 0 to 6 mole percent CoO, 0 to 6 mole percent NiO wherein the sum of $TiO_2$, $B_2O_3$, $Fe_2O_3$, CoO, and NiO is from 1 to 15 mole percent and wherein said glass also contains about 1 to 8 mole percent of an additional oxide which is a member selected from the group consisting of $V_2O_5$, $CeO_2$, $ThO_2$, $MoO_3$, $Nb_2O_5$, $Ta_2O_5$, $GeO_2$, $WO_3$, $La_2O_3$, $ZrO_2$, $HfO_2$, BeO, PbO and mixtures thereof, the sum of $SiO_2+Cu_2O$ being at least 70 mole percent and the sum of $Cu_2O+Al_2O_3$ being at least 5 mole percent.

2. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$, and 1 to 8 mole percent $V_2O_5$.

3. A glass composition according to claim 1 wherein said glass consists essentially of 72 to 85 mole percent $SiO_2$, 2.5 to 15 mole percent $Al_2O_3$, 1 to 15 mole percent $Cu_2O$, 1 to 8 mole percent $B_2O_3$, 1 to 8 mole percent $TiO_2$, and 1 to 8 mole percent $CeO_2$.

4. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$, and 1 to 8 mole percent $ThO_2$.

5. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$, and 1 to 8 mole percent $MoO_3$.

6. A glass composition according to claim 1 wherein said glass consists essentially of 72 to 85 mole percent $SiO_2$, 2.5 to 15 mole percent $Al_2O_3$, 1 to 15 mole percent $Cu_2O$, 1 to 8 mole percent $B_2O_3$, 1 to 8 mole percent $TiO_2$, and 1 to 8 mole percent $WO_3$.

7. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$, and 1 to 8 mole percent $La_2O_3$.

8. A glass composition according to claim 1 wherein said glass consists essentially of 72 to 85 mole percent $SiO_2$, 2.5 to 15 mole percent $Al_2O_3$, 1 to 15 mole percent $Cu_2O$, 1 to 8 mole percent $B_2O_3$, 1 to 8 mole percent $TiO_2$, and 1 to 8 mole percent $Nb_2O_5$.

9. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$, and 1 to 8 mole percent $Ta_2O_5$.

10. A glass composition according to claim 1 wherein said glass consists essentially of 72 to 85 mole percent $SiO_2$, 2.5 to 15 mole percent $Al_2O_3$, 1 to 15 mole percent $Cu_2O$, 1 to 8 mole percent $B_2O_3$, 1 to 8 mole percent $TiO_2$, and 1 to 8 mole percent $GeO_2$.

11. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$ and 1 to 8 mole percent $HfO_2$.

12. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$ and 1 to 8 mole percent BeO.

13. A glass composition according to claim 1 wherein said glass consists essentially of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$ and 1 to 8 mole percent PbO.

14. A glass composition according to claim 1 wherein said glass consists essentialliy of 72 to 85 mole percent $SiO_2$, 2.5 to 15 mole percent $Al_2O_3$, 1.5 to 15 mole percent $Cu_2O$, 1 to 8 mole percent $B_2O_3$, 1 to 8 mole percent $TiO_2$ and 1 to 8 mole percent $ZrO_2$.

15. A glass composition according to claim 1 wherein said glass contains 65 to 85 mole percent $SiO_2$, 5 to 30 mole percent $Al_2O_3$ and 5 to 30 mole percent $Cu_2O$.

16. A low expansion glass composition of matter wherein said glass consists essentially of 50 to 94 mole percent $SiO_2$, 0.5 to 30 mole percent $Al_2O_3$, 1.5 to 35 mole percent $Cu_2O$ and about 1 to about 8 mole percent of an oxide selected from the group of oxides consisting of $ZrO_2$, $V_2O_5$, $Nb_2O_5$, $Ta_2O_5$, $HfO_2$, BeO, PbO, $CeO_2$, $ThO_2$, $MoO_3$, $GeO_2$, $WO_3$, $La_2O_3$ and mixtures thereof.

17. A glass composition according to claim 16 wherein said glass consists essentially of 70 to 85 mole percent $SiO_2$, 2 to 15 mole percent $Al_2O_3$, 1 to 15 mole percent $Cu_2O$, and 1 to 8 mole percent $ZrO_2$.

18. A glass composition according to claim 16 wherein said glass consists essentially of 70 to 85 mole percent $SiO_2$, 2 to 15 mole percent $Al_2O_3$, 2 to 15 mole percent $Cu_2O$, and 1 to 8 mole percent $V_2O_5$.

19. A glass composition according to claim 16 wherein said glass consists essentially of 70 to 85 mole percent $SiO_2$, 2 to 15 mole percent $Al_2O_3$, 2 to 15 mole percent $Cu_2O$, and 1 to 8 mole percent $Nb_2O_5$.

20. A glass composition according to claim 16 wherein said glass consists essentially of 70 to 85 mole percent $SiO_2$, 2 to 15 mole percent $Al_2O_3$, 2 to 15 mole percent $Cu_2O$, and 1 to 8 mole percent $Ta_2O_5$.

21. A glass composition according to claim 16 wherein said glass consists essentially of 70 to 85 mole percent $SiO_2$, 2 to 15 mole percent $Al_2O_3$, 2 to 15 mole percent $Cu_2O$, and 1 to 8 mole percent $HfO_2$.

22. A glass composition according to claim 16 wherein said glass consists essentially of 70 to 85 mole percent $SiO_2$, 2 to 15 mole percent $Al_2O_3$, 2 to 15 mole percent $Cu_2O$, and 1 to 8 mole percent BeO.

23. A glass composition according to claim 16 wherein said glass consists essentially of 70 to 85 mole percent $SiO_2$, 2 to 15 mole percent $Al_2O_3$, 2 to 15 mole percent $Cu_2O$, and 1 to 8 mole percent PbO.

24. A glass composition according to claim 16 wherein said glass consists essentially of 70 to 85 mole percent $SiO_2$, 2 to 15 mole percent $Al_2O_3$, 2 to 15 mole percent $Cu_2O$ and 1 to 8 mole percent $CeO_2$.

25. A glass composition according to claim 16 wherein said glass consists essentially of 70 to 85 mole percent $SiO_2$, 2 to 15 mole percent $Al_2O_3$, 2 to 15 mole percent $Cu_2O$ and 1 to 8 mole percent $ThO_2$.

26. A glass composition according to claim 16 wherein said glass consists essentially of 70 to 85 mole percent $SiO_2$, 2 to 15 mole percent $Al_2O_3$, 2 to 15 mole percent $Cu_2O$ and 1 to 8 mole percent $MoO_3$.

27. A glass composition according to claim 16 wherein said glass consists essentially of 70 to 85 mole percent $SiO_2$, 2 to 15 mole percent $Al_2O_3$, 2 to 15 mole percent $Cu_2O$ and 1 to 8 mole percent $GeO_2$.

28. A glass composition according to claim 16 wherein said glass consists essentially of 70 to 85 mole percent $SiO_2$, 2 to 15 mole percent $Al_2O_3$, 2 to 15 mole percent $Cu_2O$ and 1 to 8 mole percent $WO_3$.

29. A glass composition according to claim 16 wherein said glass consists essentially of 70 to 85 mole percent $SiO_2$, 2 to 15 mole percent $Al_2O_3$, 2 to 15 mole percent $Cu_2O$ and 1 to 8 mole percent $La_2O_3$.

30. A glass composition consisting essentially of 72 to 85 mole percent $SiO_2$, 2 to 15 mole percent $Al_2O_3$, 2 to 15 mole percent $Cu_2O$, and 2 to 12.5 mole percent BeO.

31. A low expansion glass composition consisting essentially of about 75 mole percent $SiO_2$, about 12.5 mole percent $Al_2O_3$, about 10 mole percent $Cu_2O$, and about 2.5 mole percent CaO.

32. A glass composition consisting essentially of 50–94 mole percent $SiO_2$, 0.5 to 30 mole percent $Al_2O_3$, 1.5 to 35 mole percent $Cu_2O$, wherein the sum of $SiO_2+Cu_2O$ is at least about 80 mole percent and the sum of $Cu_2O+Al_2O_3$ is at least about 10 mole percent, and about 1 to 8 mole percent of at least one oxide of a member selected from the group consisting of Cr, Ta, W, Mn, Hf, V, Mo, Cd, Nb, La, Ce, Pr, Nd, Ge, Th, Be, Ca, Zr and Pb.

References Cited

UNITED STATES PATENTS

| | | | |
|---|---|---|---|
| 3,275,492 | 9/1966 | Herbert | 106—39 |
| 3,282,711 | 11/1966 | Lin | 106—52 |
| 3,294,496 | 12/1966 | Berghezan | 106—39 |
| 3,442,666 | 5/1969 | Berghezan | 106—39 |
| 3,442,667 | 5/1969 | Berghezan | 106—39 |

HELEN M. McCARTHY, Primary Examiner

U.S. Cl. X.R.

106—53, 54